United States Patent [19]

Masuda

[11] 4,423,157
[45] Dec. 27, 1983

[54] FLUORINATED CATION EXCHANGE MEMBRANE

[75] Inventor: Yoshinori Masuda, Yokohama, Japan

[73] Assignee: Asahi Kasei Kogyo Kabushiki Kaisha, Osaka, Japan

[21] Appl. No.: 328,720

[22] Filed: Dec. 8, 1981

Related U.S. Application Data

[63] Continuation-in-part of Ser. No. 254,542, Apr. 15, 1981, abandoned.

[30] Foreign Application Priority Data

Apr. 18, 1980 [JP] Japan ................................. 55-50278

[51] Int. Cl.$^3$ ........................... B01J 47/12; C08F 6/00
[52] U.S. Cl. ....................................... 521/27; 521/30; 204/159.17
[58] Field of Search ............... 521/27, 30; 204/159.17

[56] References Cited

U.S. PATENT DOCUMENTS 3,644,319  2/1972  Seki et al. ......................... 260/92.1
4,132,682  1/1979  Seita et al. ............................ 521/27
4,174,426 11/1979  Asami et al. .......................... 521/27
4,176,215 11/1979  Molnar et al. ........................ 521/27

FOREIGN PATENT DOCUMENTS 2822824 12/1978 Fed. Rep. of Germany .

Primary Examiner—Joseph L. Schofer
Assistant Examiner—Peter F. Kulkosky
Attorney, Agent, or Firm—Birch, Stewart, Kolasch & Birch

[57] ABSTRACT

There is disclosed a fluorinated cation exchange membrane having a multi-layered structure, of which one layer contains sulfonic acid groups as ion-exchange groups and the other layer contains carboxylic acid groups as principal ion-exchange groups. The membrane is treated with an acid, followed by heat treatment at an elevated temperature in an aqueous atmosphere or aqueous solution whereby improved electrolytic performance such as electrolysis voltage and current efficiency when used in electrolysis of sodium chloride for production of caustic soda is obtained.

24 Claims, No Drawings

FLUORINATED CATION EXCHANGE MEMBRANE

BACKGROUND OF THE INVENTION

Cross Reference to Related Application

This application is a continuation-in-part of copending application Ser. No. 254,542 filed on Apr. 15, 1981 now abandoned.

FIELD OF THE INVENTION

This invention relates to a fluorinated cation exchange membrane to be used for the production of caustic soda by electrolysis of sodium chloride according to an ion-exchange membrane process. The membrane can reduce power consumption in electrolysis.

More particularly, the present invention relates to an economically advantageous fluorinated cation exchange membrane, its preparation and a process for electrolysis of sodium chloride by use of the membrane. The fluorinated cation exchange membrane has a multi-layered structure, comprising a layer containing sulfonic acid groups as ion-exchange groups and a layer containing carboxylic acid groups as principal ion-exchange groups, wherein the improvement comprises immersing the membrane which has been fabricated into a suitable form in an acid solution and then heating the membrane in an aqueous atmosphere.

DESCRIPTION OF THE PRIOR ART

In practicing electrolysis of sodium chloride according to the ion-exchange membrane process for production of caustic soda a fluorinated cation exchange membrane which is excellent in chemical resistance, heat resistance as well as mechanical strength has generally been used. Exemplary fluorinated cation exchange membranes conventionally used in the art include a membrane having pendant sulfonic acid groups which is prepared by hydrolysis of a membrane of a copolymer of tetrafluoroethylene with perfluoro-3,6-dioxy-4-methyl-7-octenesulfonylfluoride (trade name "Nafion", produced by E. I. Du Pont de Nemours and Company, U.S.A.). Due to the high water content of sulfonic acid groups, however, such a sulfonic acid type fluorinated cation exchange membrane will readily permit hydroxyl ions to permeate from the cathode compartment to the anode compartment therethrough, whereby electrolysis can be performed only with a disadvantageously low current efficiency in spite of the advantage that it can lower electrolysis voltage. For improvement of this drawback, there has been proposed a fluorinated cation exchange membrane having a multi-layered structure, comprising a layer containing sulfonic acid groups as ion-exchange groups and a layer containing carboxylic acid groups as principal ion-exchange groups. Since the current efficiency of an ion-exchange membrane depends on the water content in the layer on the cathode side of the membrane, it is possible to improve the current efficiency of the membrane by providing a thin layer of 0.01 to 50 microns in thickness at least on the cathode side of the membrane, the thin layer being constituted of a layer containing carboxylic acid groups with lower water content as principal ion-exchange groups. When the ion-exchange groups through the entire thickness of the membrane are composed of carboxylic acid groups as principal ion-exchange groups, however, the electrolysis voltage is thereby disadvantageously increased. For this reason, it is desirable to have only the above thin layer composed principally of carboxylic acid groups, with the remainder of the membrane being a layer comprising sulfonic acid groups with lower electrolysis voltage, thus imparting mechanical strength to the thin layer principally composed of carboxylic acid groups. By use of the thus prepared multi-layered fluorinated cation exchange membrane, the power consumption for electrolysis of sodium chloride can successfully be reduced to some extent. In view of the importance of energy-saving further reduction in the power consumption is still desirable.

SUMMARY OF THE INVENTION

The present inventor has made extensive studies in order to further enhance current efficiency during electrolysis of sodium chloride, with a simultaneous decrease in electrolysis voltage, by use of a fluorinated cation exchange membrane having a multi-layered structure comprising a layer containing sulfonic acid groups as ion-exchange groups and a layer containing carboxylic acid groups as principal ion-exchange groups. As a result, it has now been found that this object can be achieved by first immersing the membrane having the multi-layered structure in an acid and then heating the treated membrane in an aqueous atmosphere.

DETAILED DESCRIPTION OF THE INVENTION

The improved current efficiency with lowered electrolysis voltage effected according to the present invention is thought to be due to the fact that the layer comprising sulfonic acid groups will selectively swell, while the layer containing carboxylic acid groups as principal ion-exchange groups selectively shrink as a result of the treatment according to the present invention. A fluorinated cation exchange membrane having sulfonic acid groups as ion-exchange groups will swell when the ion-exchange groups are converted to the H-form. In contrast, a fluorinated cation exchange membrane having carboxylic acid groups as ion-exchange groups will shrink, when the ion-exchange groups are converted to the H-form. Accordingly, when a fluorinated cation exchange membrane having a multi-layered structure comprising a layer containing sulfonic acid groups as ion-exchange groups and a layer containing carboxylic acid groups as principal ion-exchange groups is immersed in an acid to convert the ion-exchange groups to the H-form, followed by heat treatment in an aqueous atmosphere, the layer containing sulfonic acid groups will swell, whereby the water content is increased therein to lower the electrolysis voltage, while the layer containing carboxylic acid groups as principal ion-exchange groups will shrink, whereby the water content is decreased therein to elevate the current efficiency. Naturally, by shrinkage of the layer containing carboxylic acid groups as principal ion-exchange groups, the voltage drop in the layer will be increased. But such a voltage drop has little influence upon the voltage drop in the whole membrane, since the layer is very thin.

The layers constituting the fluorinated cation exchange membrane having the multi-layered structure of the present invention, namely the layer containing sulfonic acid groups as ion-exchange groups and the layer containing carboxylic acid groups as principal ion-exchange groups, can be distinguished from each other by the species of the ion-exchange groups contained therein. However, a membrane wherein at the interface between the layers the density of the ion-exchange groups existing in the adjacent layer varies along a continuous gradient is also contemplated as being within the scope of the present invention. The interface between the layers can be observed by selective color dyeing, e.g., by using pH sensitive dyeing solutions which produces different colors at various pH values, or by successively slicing or cutting off surface layers of the membrane, while measuring the attenuated total reflection on the cut surface, and repeating such a cut-off operation in the direction of the depth to thereby follow the change in the density of various ion-exchange groups corresponding to the various depths of cut-off.

In the present invention, the layer containing carboxylic acid groups as principal ion-exchange groups refers to a layer in which carboxylic acid groups are contained in a percentage of at least 50%, preferably at least 60%, based on the total ion-exchange groups in the layer. In this layer carboxylic acid groups may be co-present in a mixture with other ion-exchange groups. If the percentage of carboxylic acid groups in the layer is not less than 60%, the current efficiency in electrolysis of sodium chloride using such a membrane can favorably be high.

In carrying out the treatment of a fluorinated cation exchange membrane having the multi-layered structure comprising a layer containing sulfonic acid groups and a layer containing carboxylic acid groups as principal ion-exchange groups by immersion in an acid to convert the ion-exchange groups to the H-form, the acid employed is not specifically limited in its concentration but it will suffice to employ a proton concentration to convert most of the ion-exchange groups to the H-form, preferably 0.01 N or higher. The immersion temperature is not particularly limited, but is preferably from room temperature (20° C.) to 95° C. The acid to be used in the present invention may be either inorganic or organic. As inorganic acids, there may be mentioned hydrochloric acid, nitric acid, sulfuric acid, phosphoric acid, hydrofluoric acid, etc. The organic acid may include acetic acid, oxalic acid, formic acid, etc. However, the acid is not limited to these specific examples. Of these acids, hydrochloric acid, nitric acid and sulfuric acid may preferably be used to readily convert the ion-exchange groups to the H-form.

The fluorinated cation exchange membrane having the multi-layered structure according to the present invention, following the treatment by immersion in an acid, is then subjected to heat treatment in an aqueous atmosphere or solution. The aqueous atmosphere or solution refers to a system in which the membrane can be constantly maintained under a wet state, for example, by being immersed in an aqueous solution or placed in a saturated water vapor. More specifically, there may be mentioned such methods as (1) a method in which the membrane is immersed in water, (2) a method in which the membrane is immersed in an aqueous acid solution such as of hydrochloric acid, sulfuric acid or nitric acid with a concentration of 0.01 N or higher or (3) a method in which the membrane is suspended in a saturated water vapor. When the heat treatment is carried out in an aqueous acid solution, such a treatment may be considered that the immersion treatment into an aqueous acid solution is combined with heat treatment. But these methods should not be construed as limitative of the invention. The method in which the membrane is suspended in a saturated water vapor is preferred, since it can easily be practiced in commercial application. It should be noted, however, that the heat treatment of the membrane in an unsaturated water vapor is not desirable, since the electrolysis voltage will be increased due to the drying of the membrane effected by such a treatment.

In carrying out the heat treatment in an aqueous atmosphere according to the present invention, the treatment temperature is important and is preferably not lower than 110° C., more preferably 125° C. or higher but lower than the temperature at which decomposition of the fluorinated cation exchange membrane occurs, and it is also preferred that the treatment temperature is not lower than the glass transition temperature of the polymer constituting the membrane. By this heat treatment, the layer containing sulfonic acid groups will be deformed under swelling stress, while the layer containing carboxylic acid groups as principal ion-exchange groups is deformed under shrinking stress. Therefore, it is necessary to apply a stress to make deformations by the swelling and shrinking plastic deformations. At a treatment temperature lower than 110° C., the plastic deformations are too small to give sufficiently persistent effects of enhanced current efficiency and decreased electrolysis voltage. A treatment temperature of 125° C. or higher may preferably be used, since the effect of the present invention can be maintained for a long term. On the other hand, when the treatment temperature is lower than the glass transition temperature of the membrane, plastic deformations can difficultly be effected and it will take a very long time before the effect of the present invention can be achieved to a great disadvantage in commercial application. Of course, it is required to carry out the heat treatment at a temperature at which no thermal decomposition of the membrane will occur.

The glass transition temperature of a membrane can be measured in a conventional manner according to differential scanning calorimetry, DSC. In the present invention, measurement was carried out at a temperature elevation rate of 10° C./min. using differential scanning calorimeter TG-DSC Model 8085 D, produced by Rigaku Denki Co., Ltd.

The time necessary for the heat treatment varies depending on the treatment temperature and the glass transition temperature of the membrane and is not specifically limited. Preferably, however, it is at least 30 minutes or longer, more preferably at least 3 hours.

The fluorinated cation exchange membrane which has been immersed in an acid, followed by the heat treatment in an aqueous atmosphere, may be mounted as such in an electrolytic cell. Alternatively, it is generally preferred to treat the membrane with an aqueous caustic soda solution for conditioning prior to mounting. Such a conditioning may be effected by immersing the membrane in a 0.01 to 10 N aqueous caustic soda solution at room temperature to 95° C. More preferably, there may also be added a water-soluble organic solvent to the caustic soda solution in an amount of 5 to 95% by weight. As organic solvents to be employed, there may be mentioned polar organic solvents such as methanol, ethanol, isopropanol, ethylene glycol, propylene glycol, glycerine, dimethyl sulfoxide, acetone, methyl ethyl ketone, tetrahydrofuran and dioxane. By such a conditioning treatment, it is possible to eliminate the strains at the interface between the layer containing sulfonic acid groups and the layer containing carboxylic acid groups as principal ion-exchange groups caused by the stress, whereby the damages occurring during electrolysis of the fluorinated cation exchange membrane can be avoided.

The degree of swelling of the sulfonic acid layer and the degree of shrinkage of the layer principally composed of carboxylic acid groups in the composite film subjected to the treatment of this invention can be judged by staining the membrane with a cationic dye. That is, the sulfonic acid layer of the membrane with a multi-layered structure is swelled by the treatment of this invention and is stained at an increased speed, while the layer principally composed of carboxylic acid groups is shrunk by the treatment and is stained at a decreased speed. In particular, the increase of staining speed in the sulfonic acid layer is marked. When a membrane with a multi-layered structure is immersed in an acid and subjected to heating treatment in an aqueous atmosphere, while elevating the temperature, the sulfonic acid layer is gradually swelled to increase the staining speed therein. However, at a temperature exceeding 110° C., the changes in staining speed will lessen until there is no more change at about 125° C. or higher. When the treatment of this invention is applied, the staining speed in the sulfonic acid layer is increased by 15% or more than before such a treatment, while the speed in the layer principally composed of carboxylic acid groups is decreased by 5% or more. The staining speed remains substantially unchanged, even when the treatment of this invention is conducted repeatedly.

Accordingly, it is possible to judge whether the treatment of this invention has been applied or not by measurement of the staining speed in the sulfonic acid layer of a membrane with a multi-layered structure. That is, a membrane to be judged may be dipped in an acid and then subjected to heating treatment at 110° C. in an aqueous atmosphere. If there is no change, or an increase less than 15%, in staining speed, as compared with that before the treatment, the membrane tested may be judged to have applied the treatment of this invention. On the contrary, if there is a change in staining speed of 15% or more, it can be judged to be without the treatment of this invention.

The staining speed in the present invention is measured according to the following method.

An ion-exchange membrane with a multi-layered structure is immersed for conditioning in a 0.1 N aqueous caustic soda at 90° C. for 15 hours, followed by washing with water. Then, said membrane is immersed for staining in a 0.5% aqueous AIZEN COLOUR CATILON ORANGE RH ® (produced by Hodogaya Chemical Co., Ltd.) at 60° C. for one hour. The stained membrane is sliced with a sharp razor and the depth of staining is measured by observation of the cross-section of the sliced strip by an optical microscope (× 60) and the staining speed per one hour is determined therefrom. The measurements are conducted three times at different positions and the average of the values obtained is calculated.

The fluorinated cation exchange membrane having a multi-layered structure, comprising a layer containing sulfonic acid groups as ion-exchange groups and a layer containing carboxylic acid groups as principal ion-exchange groups, can be prepared according to the methods as exemplified below:

(1) A membrane having pendant sulfonic acid groups (trade name "Nafion", produced by E. I. Du Pont de Nemours and Company), prepared by hydrolysis of a membrane of a copolymer of tetrafluoroethylene and perfluoro-3,6-dioxy-4-methyl-7-octenesulfonylfluoride, is subjected to the reduction treatment only on one surface to provide a carboxylic acid layer thereon, as is disclosed in U.S. Pat. No. 4,151,053;

(2) Only one surface of "Nafion" is subjected to the oxidation treatment with an organic solvent vapor to provide a carboxylic acid layer thereon, as is disclosed in Japanese Published Unexamined Patent Application No. 83982/1979;

(3) Only one surface of "Nafion" is treated with a basic aqueous solution containing a compound having amino groups or ammonium ions to provide a membrane containing carboxylic acid groups and sulfonamide groups mixed therein, as is disclosed in Japanese Published Unexamined Patent Application No. 41287/1979;

(4) Only one surface of a membrane of a copolymer of tetrafluoroethylene and perfluoro-3,6-dioxy-4-methyl-7-octenesulfonylchloride is treated with ammonia, an alkyl-mono- or di-amine to provide a sulfonamide membrane, which is in turn hydrolyzed and treated with nitrites to convert a membrane in which a part of sulfonamide groups are converted to carboxylic acid groups as is disclosed in Japanese Published Unexamined Patent Application No. 141188/1978; and (5) A membrane of a copolymer of tetrafluoroethylene and perfluoro-3,6-dioxy-4-methyl-7-octene-sulfonylfluoride is laminated on a membrane of a blend of the copolymer with a copolymer of tetrafluoroethylene and

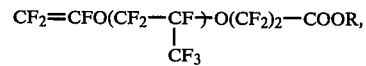

followed by hydrolysis to provide a composite membrane, as is disclosed in U.S. Pat. No. 4,176,215. The preparation methods, however, are not limited to these examples.

For the purpose of reinforcement, fluorinated cation exchange membranes generally have supporting fibers such as of Teflon fabrics embedded therein.

In practicing electrolysis of sodium chloride by use of the fluorinated cation exchange membrane having the multi-layered structure of the present invention, it is critical to mount the membrane in an electrolytic cell so that the layer containing carboxylic groups may be positioned on the cathode side. If the layer is positioned on the anode side, the resultant current efficiency is low.

Referring now to an electrolytic cell and electrolysis conditions preferably used in the present invention, electrolysis is carried out, while feeding an aqueous sodium chloride solution into the anode compartment, while supplying water or an aqueous dilute alkali solution into the cathode compartment to control the alkali hydroxide concentration at the outlet from the cathode compartment.

The aqueous sodium chloride solution to be fed into the anode compartment may be purified similarly as in a conventional electrolytic process for an alkali chloride. That is, a dilute aqueous sodium chloride solution discharged from the anode compartment may be subjected to such operations as dechlorination, dissolution of an alkali chloride to saturation, precipitation separation of magnesium, calcium and iron, and neutralization and then returned to the anode compartment. These steps may be conducted in the same manner as in the prior art. If necessary, the feed aqueous sodium chloride solution may desirably be further purified with granular ion-exchange resins, especially chelate resins, to reduce the calcium content to a permissible limit, preferably 1 ppm or less. The aqueous sodium chloride solution may desirably be highly concentrated, preferably near saturation.

The percentage utilization of the alkali chloride fed into the anode compartment is generally in the range from 5 to 95%, depending on the current density and the method for removal of heat, but it is preferably as high as possible.

The electrolysis temperature may generally range from 0 to 100° C. The heat generated by electrolysis is removed by cooling a part of the anolyte or the catholyte.

Chlorine gas and hydrogen gas are generated from the anode compartment and the cathode compartment, respectively. Any electrolytic cell designed to permit the generated gases to ascend along the back sides of the electrodes may advantageously be used, since it can lower the electrolysis voltage to make the power consumption smaller.

The flow velocity of the electrolyte may be controlled in each compartment by the amount of feed from outside, and further may desirably be accelerated by the gases generated from the cathode and anode compartments. For this purpose, it is also desirable to employ a porous electrode such as a metal mesh electrode so as to permit the electrolyte in each compartment to be circulated with ascending flow of gases.

With regard to the electrodes, a cathode may desirably be made of iron or a plated iron which is plated with nickel or a nickel compound in view of the overvoltage. On the other hand, an anode may desirably be a metal mesh electrode having a metal oxide of a noble metal such as ruthenium coated thereon.

The present invention will now be illustrated in more detail by reference to Examples.

EXAMPLE 1

Tetrafluoroethylene and perfluoro-3,6-dioxy-4-methyl-7-octenesulfonylfluoride were copolymerized to obtain a copolymer having an equivalent weight (weight of dry resin containing one equivalent of ion exchange groups) of 1200. The copolymer was molded by heating into a membrane having a thickness of 125 microns, followed by hydrolysis with caustic soda to give a perfluorosulfonic acid type cation exchange membrane.

The membrane was treated with phosphorus pentachloride to convert sulfonic acid groups to sulfonyl chloride groups. Then, only one surface of the membrane was subjected to the reduction treatment with hydroiodic acid to convert the sulfonyl chloride groups to carboxylic acid groups. Subsequently, after the membrane has been hydrolyzed with caustic soda, it was dyed with a Malachite Green solution to ascertain that the layer with a thickness of 10 microns on the treated surface had been converted to carboxylic acid groups.

The thus prepared fluorinated cation exchange membrane having a double-layered structure was immersed in 1 N hydrochloric acid at room temperature for 15 hours to convert the ion-exchange groups to the H-form. Then, the membrane was charged into an autoclave containing water at the bottom and the temperature was elevated to 140° C. and maintained thereat for 30 hours. The membrane was inserted between the spacers so that it would not be immersed into the water. After elevation of the temperature, the valve of the autoclave was opened for a short time for purging of the air contained in the vessel, whereby it was confirmed that the pressure was indicated to be about 2.6 atm/cm$^2$-G and the membrane was exposed to a saturated water vapor.

Subsequently, the membrane was immersed in a solution comprising 6 N caustic soda/methanol (1:1, volume ratio) at 75° C. for 30 hours and then in an aqueous 0.1 N caustic soda solution at 90° C.

The staining speed of the membrane obtained was measured to be 37 micron/hour for the sulfonic acid layer and 9 micron/hour for the carboxylic acid layer.

The membrane subjected to the treatment of this invention was again converted to the H-form by the same method as described above and thereafter subjected to heat treatment, followed by conditioning. The heat treatment for this time was performed at 110° C. The staining speed in the sulfonic acid layer of the re-treated membrane was measured to be 37 micron/hour.

The thus prepared membrane was assembled in an electrolytic cell so that the layer comprising carboxylic acid groups was on the cathode side and electrolysis was carried out at 90° C. at a current density of 40 A/dm$^2$. The anode used was a dimensionally stable electrode made of titanium substrate coated with ruthenium oxide and the cathode was a mesh made of iron. A 3 N aqueous sodium chloride solution having a pH of 2 was fed into the anode compartment, while a 6.5 N caustic soda solution was fed into the cathode compartment. The electrolysis voltage was found to be 2.95 V, with a currrent efficiency of 94%.

COMPARATIVE EXAMPLE 1

The same fluorinated cation exchange membrane having the double-layered structure comprising the sulfonic acid layer and the carboxylic acid layer as used in Example 1 was assembled without application of the treatments according to the present invention in an electrolytic cell. Electrolysis of sodium chloride was conducted under the same conditions as in Example 1. As the result, the electrolysis voltage was found to be 3.1 V with a current efficiency of 90%.

The staining speed of said membrane was measured to be 26 micron/hour for the sulfonic acid layer and 12 micron/hour for the carboxylic acid layer.

Further, said membrane was converted to the H-form by the same method as in Example 1, and then subjected to heat treatment, followed by conditioning. The heat treatment this time was conducted at 110° C. The staining speed in the sulfonic acid layer of the treated membrane was 33 micron/hour.

COMPARATIVE EXAMPLE 2

The same fluorinated cation exchange membrane having the double-layered structure comprising the sulfonic acid layer and the carboxylic acid layer as used in Example 1 was subjected to the heat treatment in a saturated water vapor and the conditioning treatment in caustic soda similarly as in Example 1, except for omitting the treatment of immersion in hydrochloric acid. Using the membrane, electrolysis of sodium chloride was conducted in the same manner as in Example 1. The results were 3.5 V for electrolysis voltage and 88% for current efficiency.

EXAMPLES 2 TO 7 AND COMPARATIVE EXAMPLES 3 AND 4

Tetrafluoroethylene and perfluoro-3,6-dioxy-4-methyl-7-octenesulfonylfluoride were copolymerized to obtain a copolymer having an equivalent weight of 1100 (Polymer A) and a copolymer having an equivalent weight of 1350 (Polymer B). These copolymers were heat molded into membranes having a thickness of 100 microns and 40 microns, respectively. After these membranes were laminated, Teflon fabric was embedded in the layer of Polymer A, followed by hydrolysis with caustic soda to obtain a sulfonic acid type cation exchange membrane.

The membrane was subjected to a reduction treatment in the same manner as in Example 1 to give a fluorinated cation exchange membrane with a double-layered structure having a carboxylic acid layer with a thickness of 10 microns on the surface of Polymer B.

The thus prepared membrane with the double-layered structure was immersed in 0.1 N sulfuric acid at room temperature for 15 hours to convert the ion-exchange groups to the H-form. The membrane was then charged into an autoclave containing 0.1 N sulfuric acid so that the membrane may be immersed into the aqueous sulfuric acid, and then subjected to the heat treatment. The treatment temperature and time are indicated in Table 1. The membrane was then immersed in a mixture of 2 N caustic soda/dimethyl sulfoxide (=7/1) at 80° C. for 30 hours and thereafter in an aqueous caustic soda solution at 90° C.

The dyeing speeds of the membranes obtained were measured to give the results as shown in Table 1.

The thus prepared membrane was assembled in an electrolytic cell so that the carboxylic acid layer may face toward the cathode and electrolysis of sodium chloride was conducted in the same manner as in Example 1. Table 1 shows the results of electrolysis voltage and current efficiency after one week and after 6 months.

EXAMPLE 8

Tetrafluoroethylene and perfluoro-3,6-dioxy-4-methyl-7-octenesulfonylfluoride were copolymerized to obtain a copolymer having an equivalent weight of 1100 (Polymer A). Tetrafluoroethylene was also copolymerized with $CF=CFOCF_2CF(CF_3)OCF_2CF_2COOCH_3$ to obtain a copolymer having an equivalent weight of 1100 (Polymer C).

Polymer A and Polymer C were blended at a weight ratio of ½, followed by heat molding into a membrane with a thickness of 50 microns. Separately, only Polymer A was heat molded into a membrane with a thickness of 100 microns. These membranes were laminated and then hydrolyzed with caustic soda to give a fluorinated cation exchange membrane with a double-layered structure comprising a layer containing sulfonic acid groups and a layer containing both carboxylic acid groups and sulfonic acid groups mixed therein.

The membrane was immersed in a 5 N nitric acid at 90° C. for 15 hours to convert the ion-exchange groups to the H-form. Then, the membrane was charged into an autoclave containing water so that the membrane may be immersed into water and the heat treatment was effected at 140° C. for 30 hours. Subsequently, the membrane was immersed into a 0.1 N caustic soda at 95° C. for 30 hours.

The thus prepared membrane was assembled in an electrolytic cell so that the layer containing carboxylic acid groups as principal ion-exchange groups may be on the cathode side and electrolysis was carried out in the same manner as in Example 1. In this Example there was supplied 8 N caustic soda into the cathode compartment. As the result, the electrolysis voltage was found to be 3.8 V and the current efficiency 96%.

COMPARATIVE EXAMPLE 5

The same fluorinated cation exchange membrane having the double-layered structure as in Example 8 was employed without application of the treatments according to the present invention and electrolysis of sodium chloride was performed under the same conditions as in Example 8. As the result, the electrolysis voltage was found to be 4.0 V and the current efficiency 92%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluorinated cation exchange membrane having a multi-layered structure, comprising a layer containing sulfonic acid groups as ion-exchange groups and a layer containing carboxylic acid groups as principal ion-exchange groups, said membrane being formed by a process which comprises subjecting said membrane which has been fabricated into a suitable form to treatment

TABLE 1

| | Heat Treatment in 0.1N $H_2SO_4$ | | Staining Speed | | After One Week | | | After Six Months | | |
|---|---|---|---|---|---|---|---|---|---|---|
| | Temperature (°C.) | Time (hour) | Sulfonic Acid layer (micron/hr) | Carboxylic Acid Layer (micron/hr) | Electrolysis voltage (V) | Current Efficiency (%) | Power Unit (KWH/T-NaOH) | Electrolysis voltage (V) | Current Efficiency (%) | Power Unit (KWH/T-NaOH) |
| Comparative Example 3 | 30 | 30 | 31 | 9 | 3.75 | 94.5 | 2659 | 3.80 | 93 | 2738 |
| Comparative Example 4 | 100 | 30 | 35 | 9 | 3.70 | 95 | 2609 | 3.78 | 93 | 2723 |
| Example 2 | 110 | 30 | 40 | 7 | 3.65 | 96 | 2547 | 3.68 | 95.5 | 2582 |
| Example 3 | 120 | 30 | 40 | 7 | 3.65 | 96.5 | 2534 | 3.68 | 96 | 2568 |
| Example 4 | 125 | 30 | 43 | 6 | 3.62 | 97.5 | 2488 | 3.63 | 97 | 2507 |
| Example 5 | 140 | 1 | 41 | 6 | 3.64 | 96.5 | 2527 | 3.68 | 96 | 2568 |
| Example 6 | 140 | 30 | 43 | 6 | 3.60 | 97.5 | 2474 | 3.62 | 97 | 2500 |
| Example 7 | 160 | 30 | 44 | 6 | 3.60 | 97.5 | 2474 | 3.61 | 97 | 2494 | with an acid by immersing said membrane therein, heat treating said membrane in an aqueous atmosphere or an aqueous solution at a temperature not lower than 110° C. for at least 30 minutes, and further subjecting said membrane to conditioning by immersing in a 0.01 to 10 N aqueous caustic soda solution prior to being mounted in an electrolytic cell.

2. A fluorinated cation exchange membrane according to claim 1, wherein the temperature of the heat treatment is not lower than the glass transition temperature of the polymer constituting said membrane.

3. A fluorinated cation exchange membrane according to claim 2, wherein the percentage of the carboxylic acid groups in the layer containing carboxylic acid groups as principal ion-exchange groups is at least 60% based on the total ion-exchange groups in said layer.

4. A fluorinated cation exchange membrane according to claim 2 or claim 3, wherein the acid in which the membrane is immersed is an acid selected from the group consisting of hydrochloric acid, sulfuric acid and nitric acid.

5. A fluorinated cation exchange membrane according to claim 2 or claim 3, wherein said heat treating is conducted in a saturated water vapor.

6. A fluorinated cation exchange membrane according to claim 7, wherein the heat treating is carried out at a temperature which is higher than 125° C. but lower than the temperature at which decomposition of the membrane occurs.

7. A fluorinated cation exchange membrane according to claim 2 or claim 3, wherein the heat treatment is continued for at least 3 hours.

8. A fluorinated cation exchange membrane according to claim 2, wherein there is added into said aqueous caustic soda solution for the conditioning an organic solvent selected from the group consisting of methanol, ethanol, isopropanol, ethylene glycol, propylene glycol, glycerine, dimethyl sulfoxide, acetone, methyl ethyl ketone, tetrahydrofuran and dioxane in an amount of 5 to 95% by weight.

9. A process for producing a fluorinated cation exchange membrane which comprises fabricating a fluorinated cation exchange membrane having a multi-layered structure, comprising a layer containing sulfonic acid groups as ion-exchange groups and a layer containing carboxylic acid groups as principal ion-exchange groups, into a suitable form, immersing said membrane in an acid, heating the treated membrane in an aqueous atmosphere at a temperature not lower than 110° C. for at least 30 minutes, and further subjecting said membrane to conditioning by immersing in a 0.01 to 10 N aqueous caustic soda solution prior to being mounted in an electrolytic cell.

10. A process according to claim 9, wherein the temperature of the heat treatment is not lower than the glass transition temperature of the polymer constituting said membrane.

11. A process according to claim 10, wherein the percentage of the carboxylic acid groups in the layer containing carboxylic acid groups as principal ion-exchange groups is at least 60% based on the total ion-exchange groups in said layer.

12. A process according to claim 10 or claim 11, wherein the acid in which the membrane is immersed is an acid selected from the group consisting of hydrochloric acid, sulfuric acid and nitric acid.

13. A process according to claim 10 or claim 11, wherein said aqueous atmosphere is a saturated water vapor.

14. A process according to claim 10, wherein the heat treatment is carried out at a temperature which is higher than 125° C. but lower than the temperature at which decomposition of the membrane occurs.

15. A process according to claim 10 or claim 11, wherein the heat treatment is continued for at least 3 hours.

16. A process according to claim 10, wherein there is added into said aqueous caustic soda solution for the conditioning an organic solvent selected from the group consisting of methanol, ethanol, isopropanol, ethylene glycol, propylene glycol, glycerine, dimethyl sulfoxide, acetone, methyl ethyl ketone, tetrahydrofuran and dioxane in am amount of 5 to 95% by weight.

17. In a process for electrolysis of sodium chloride comprising electrolyzing sodium chloride in an electrolytic cell divided into an anode compartment and a cathode compartment by a cation exchange membrane to produce caustic soda, the improvement which comprises using as said cation exchange membrane a fluorinated cation exchange membrane having a multi-layered structure, comprising a layer containing sulfonic acid groups as ion-exchange groups and a layer containing carboxylic acid groups as ion-exchange groups, after subjecting said membrane to treatment with an acid by immersing said membrane therein, followed by heat treatment in an aqueous atmosphere or aqueous solution at a temperature not lower than 110° C. for at least 30 minutes, and further subjecting said membrane to conditioning by immersing in a 0.01 to 10 N aqueous caustic soda solution prior to mounting in the electrolytic cell.

18. A process according to claim 17, wherein the temperature of the heat treatment is not lower than the glass transition temperature of the polymer constituting said membrane.

19. A process according to claim 18, wherein the percentage of the carboxylic acid groups in the layer containing carboxylic acid groups as principal ion-exchange groups is at least 60% based on the total ion-exchange groups in said layer.

20. A process according to claim 18 or claim 19, wherein the acid in which the membrane is immersed is an acid selected from the group consisting of hydrochloric acid, sulfuric acid and nitric acid.

21. A process according to claim 18 or claim 19, wherein said aqueous atmosphere is a saturated water vapor.

22. A process according to claim 18, wherein the heat treatment is carried out at a temperature which is higher than 125° C. but lower than the temperature at which decomposition of the membrane occurs.

23. A process according to claim 18 or claim 19, wherein the heat treatment is continued for at least 3 hours.

24. A process according to claim 18, wherein there is added into said aqueous caustic soda solution for the conditioning an organic solvent selected from the group consisting of methanol, ethanol, isopropanol, ethylene glycol, propylene glycol, glycerine, dimethyl sulfoxide, acetone, methyl ethyl ketone, tetrahydrofuran and dioxane in an amount of 5 to 95% by weight.

* * * * *